Patented June 11, 1940

2,204,364

UNITED STATES PATENT OFFICE

2,204,364

LAMELLAR TRISODIUM PHOSPHATE HYDRATE

Raymond J. Kepfer, Lakewood, Ohio, assignor to E. I. du Pont de Nemours & Company, Wilmington, Del., a corporation of Delaware No Drawing. Application March 5, 1938, Serial No. 194,079

5 Claims. (Cl. 23—239)

This invention relates to the manufacture of compositions of matter comprising trisodium phosphate hydrate in the form of relatively large high bulking lamellae, and more particularly to processes for producing such compositions by dissolving alkali metal sulfates and carbonates in molten trisodium phosphate hydrate and solidifying the molten material and forming high bulking lamellae.

Various processes are known in the art for flaking trisodium phosphate hydrate. In these processes trisodium phosphate hydrate is melted in its water of crystallization and solidified on a suitably cooled surface in the form of a thin layer and then formed into flakes. In one such process the melt is fed continuously to the surface of a rotating water-cooled drum from which the solidified material is flaked by means of suitable knives or scrapers.

In the operation of these processes it is necessary to make rather dense flakes in order to obtain a material which will not disintegrate to a powder when it is removed from the flaking drum. The formation of this powder is due to the fact that when the molten trisodium phosphate hydrate is chilled on the drum it rapidly crystallizes into a brittle form incapable of being flaked from the drum without considerable disintegration. Efforts to reduce the thickness of the flakes not only result in the production of a large quantity of this fine powder but also in a material reduction in the size of the flakes so that, irrespective of the operating conditions, a product having great bulk cannot be obtained.

I have now found that the tendency of trisodium phosphate hydrate melts to solidify into a brittle crystalline form may be avoided by incorporating alkali metal sulfates and carbonates in the molten trisodium phosphate hydrate. Thus by dissolving alkali metal sulfates and carbonates in molten trisodium phosphate hydrate, solidifying the molten material in the form of a continuous thin semi-solid film, and forming the film into lamellae of suitable high bulking shape or form, I am able to produce a material having greater bulk and greater resistance to mechanical abuse than heretofore possible and at the same time to avoid the disadvantage of the forming of large quantities of powdered material.

By solidifying molten trisodium phosphate hydrate containing alkali metal sulfates and carbonates on a water-cooled drum to a semi-solid state and stripping the solidified material from the drum with suitable knives, I am able to produce trisodium phosphate hydrate in the form of thin, curly, somewhat lace-like and semi-plastic flakes bulking more than 70 cubic inches per pound. These flakes are entirely different in form and appearance from the ordinary flakes. The latter are stolid, flat, and somewhat brittle with little or no curvature except as may have been imparted by the curvature of the flaking drum, whereas the flakes of this invention are thin, curly, semi-plastic, and somewhat lace-like in appearance.

This difference in the character of the flakes may be attributable to the difference in the flaking procedure. Thus, where the ordinary flakes were of necessity stripped from the flaking drum after complete solidification, the flakes of this invention are stripped while the film on the flaking drum is still in the semi-solid state. Thus the film tends to curl during stripping so that shapes entirely apart from the curvature of the drum are imparted to the resulting flakes.

Notwithstanding the thin, curly form of these flakes, they offer superior resistance to mechanical abuse because of their semi-plastic nature and may be packaged in cartons or barrels, shipped and handled under adverse conditions without any substantial reduction in size or the formation of powder.

Alkali metal sulfates and carbonates when dissolved in a melt of trisodium phosphate hydrate in suitable amounts and in suitable proportions will inhibit the crystallization of the trisodium phosphate hydrate sufficiently to permit the formation of curly, semi-plastic flakes. The sulfates and carbonates alone do not retard crystallization sufficiently for most purposes. Quite surprisingly, however, mixtures of sulfates and carbonates will retard crystallization of the trisodium phosphate hydrate melt to a degree entirely disproportionate to the effect of either the sulfate or the carbonate alone.

The amount of sulfate and carbonate required to plasticize the trisodium phosphate hydrate sufficiently to admit of stripping the solidified melt from the drum while still in a semi-solid and plastic state may be varied widely according to the particular conditions obtaining. Thus the water content of the melt, the speed of the drum, the temperature of the drum and the rate at which the melt is fed to the drum will all have a bearing upon the amount of sulfate and carbonate required.

While it is not feasible in view of the number of factors involved to rationalize the effect of all the variables or to give particular instructions to cover each, those skilled in the art, with a little experience with plasticized melts, will be able to produce flakes having satisfactory high bulk. I have found, however, that by maintaining the composition of the melt within certain limits it is possible to obtain uniformly satisfactory flakes by simply correlating the speed and temperature of the drum so that the proper degree of solidification obtains at the point the solidified material is stripped from the drum.

The preferred composition of the melt for this purpose will be pointed out presently.

From the foregoing it will be apparent that the water content of the melt should be maintained within certain limits to obtain satisfactory flaking. While this may be determined readily for any given set of conditions, I have found that satisfactory results may be obtained in general with melts containing from 50 to 65 per cent of water. With less water the sulfates and carbonates are not sufficiently soluble in the melt. With more water the flakes are too moist unless an excessively long drying period is maintained during solidification. Somewhat better flakes are obtained with melt of from 53 to 58 per cent of water, but the difference is slight and may differ somewhat according to the particular conditions obtaining.

Since considerable water is lost during the flaking operation the freshly prepared flakes will contain less water than the melt. Moreover, the flakes gradually lose water during storage. It will be apparent accordingly that the composition of the flakes, insofar as the water content is concerned, will vary considerably from the composition of the melt. The relative proportions of solids figured on an anhydrous basis, however, will remain substantially the same. It will be expedient therefore to make all calculations, with the exception of the water content, of course, on an anhydrous basis so that the composition of the melt and that of the flakes may be directly compared.

While the alkali metal sulfates and carbonates may be employed in various amounts and in various proportions as above stated, it has been found desirable to have an alkali metal sulfate-carbonate content not substantially less than about 5 per cent and not substantially more than 30 per cent, the proportion of alkali metal sulfate to carbonate being from 1:4 to 4:1, and all calculations being on the anhydrous basis as above indicated. Preferably, the alkali metal sulfate-carbonate contents should be about 14 per cent to 22 per cent and in the proportion of 1:2 to 2:1.

It will be understood that in commercial practice the above values need only be approximated since it is not desirable or necessary to analyze the several ingredients or the resulting flakes. On the contrary, the skill of the operator may be relied upon in adapting the flaking operation to such variations as may occur in the melt.

Thus in preparing the melt it may be assumed that the trisodium phosphate hydrate contains twelve molecules of water, tho as a matter of fact it may contain more or less. Likewise, slightly less than the optimum amounts of carbonate and sulfate may be added since commercial trisodium phosphate hydrate usually contains small amounts of carbonate and sulfate. For example, a melt prepared with 85.2% trisodium phosphate hydrate ($Na_3PO_4 \cdot 12H_2O$), 3.9% soda ash ($Na_2CO_3$), 5.9% Glauber salt ($Na_2SO_4 \cdot 10H_2O$)

and 5% water should have by calculation a sodium sulfate-carbonate content of about 15% with a carbonate to sulfate ratio of about 1.5 to 1 on an anhydrous basis, whereas by analysis the flakes obtained actually had a sulfate-carbonate content of about 18% and a carbonate to sulfate ratio of about 1.8 to 1. The low calculated values are due in part to the carbonate-sulfate content of the melt, and in part to discrepancies in the assumed water content of the salts.

It has also been found expedient to form the sulfate in situ by the addition of sulfuric acid which reacts both with any sodium hydroxide present and with the trisodium phosphate to form sodium sulfate. The reaction of the sulfuric acid with the trisodium phosphate also produces disodium phosphate which cooperates with the sulfate in much the same manner as the carbonates. Where disodium phosphate is formed in sufficient amounts, particularly where some carbonate is already present, the amount of carbonate added can be reduced an equivalent amount.

For example, a melt prepared with 95.4% trisodium phosphate hydrate, 2% sulfuric acid, and 2.6% water gave satisfactory flakes without the addition of carbonate. The flakes by analysis contained about 1.4% disodium phosphate, about 2.2% sodium carbonate, and 7.5% sodium sulfate, or in all about 11.1% on an anhydrous basis. Ordinarily, where sulfuric acid is employed, I prefer also to add a small amount of sodium carbonate to preserve the optimum proportion of carbonate to sulfate.

By the term "melt" as used herein I mean to include solutions which have never been solidified and remelted but which on being cooled give a solid product. Thus an aqueous solution of trisodium phosphate concentrated to form a melt of the desired water content may be employed equally as well as a melt prepared by melting the solid salts. In such case the alkali metal carbonate and sulfate may be added either before or after concentration. It is also possible to employ trisodium phosphate hydrate which has not been fully neutralized in the process of its manufacture as in this manner disodium phosphate may be incorporated in the melt without the addition of acid to convert part of the trisodium phosphate to disodium phosphate.

The properties of the flakes produced naturally vary somewhat in accordance with the specific conditions obtaining, particularly with respect to the rate of flow of the melt to the drum and the speed of the drum, the rate of solidifying, moisture content, and the like. When, however, conditions are maintained such that thin, curly, semi-plastic flakes are obtained, a bulkiness of from 75 to 85 cubic inches per pound or more may be readily obtained, as compared with a maximum bulkiness of less than 60 cubic inches per pound for flakes obtainable from melts containing trisodium phosphate hydrate alone.

While I have disclosed my invention specifically with reference to the production of thin, curly flakes, it will be understood that numerous variations may be made in the form of the product without departing from the spirit of this invention. Crystallization inhibitors of this invention may be employed to modify trisodium phosphate hydrate melts whenever it is desired to form the solidified material into particular shapes. This invention, however, is particularly advantageous for producing high bulking lamellae as the lamellar form, being characterized as it is by one dimension being extremely small with respect to the other two and consequently by a high ratio of surface to mass, can be obtained only with difficulty by the processes heretofore available, and then only in the form of flat plate-like flakes. By this invention lamellae may be formed in various shapes such as the thin, curly flakes previously described so as to impart great bulk to the product.

I claim:

1. A process for manufacturing trisodium phosphate hydrate in the form of shapes which comprises preparing a melt of trisodium phosphate hydrate containing an alkali metal sulfate and an alkali metal carbonate in the proportion of 2:1 to 1:2 and in a total amount of from about 14 to 22% on an anhydrous basis and in which the water content is adjusted to about 53 to 58%, solidifying the melt into a semi-solid mass and deforming said mass into the desired shapes while it is still in the semi-solid state and amenable to plastic deformation.

2. The process for manufacturing trisodium phosphate hydrate in the form of high bulking lamellae which comprises preparing a melt of trisodium phosphate hydrate containing an alkali metal sulfate and an alkali metal carbonate in the proportion of about 2:1 to 1:2 and in a total amount of about 14 to 22 per cent on an anhydrous basis, and in which the water content is adjusted to about 53 to 58 per cent, solidifying the melt in the form of a thin, semi-solid film, and deforming the film into high bulking lamellae while the film is still in the semi-solid state and amenable to plastic deformation.

3. The process for manufacturing trisodium phosphate hydrate in the form of high bulking lamellae which comprises preparing a melt of trisodium phosphate hydrate containing sodium sulfate and sodium carbonate in the proportion of about 2:1 to 1:2 and in a total amount of about 14 to 22 per cent on an anhydrous basis, and in which the water content is adjusted to about 53 to 58 per cent, solidifying the melt in the form of a thin, semi-solid film, and deforming the film into high bulking lamellae while the film is still in the semi-solid state and amenable to plastic deformation.

4. A composition of matter in the form of thin, curly, somewhat lace-like flakes bulking about 75 to 85 cubic inches per pound containing trisodium phosphate, sodium carbonate, sodium sulfate, and water of crystallization, said composition having on an anhydrous basis about 14 to 22 per cent of sodium carbonate and sodium sulfate in the proportion of about 1:2 to 2:1 and the balance substantially trisodium phosphate.

5. In a process for flaking trisodium phosphate hydrate the method of obtaining thin, curly flakes bulking more than 70 cu. in. per pound which comprises preparing a melt consisting essentially of alkali metal sulfate, alkali metal carbonate, trisodium phosphate, and water in proportions to give on an anhydrous basis from about fourteen to twenty-two per cent combined of alkali metal sulfate and alkali metal carbonate in the proportions of 1—4 to 4—1, casting the melt into a thin semi-solid film on a flaking drum and stripping the film from said drum while it is in a semi-solid state and amenable to plastic deformation whereby the film curls during stripping and breaks up into thin curly flakes having a shape entirely distinct from the curvature of the flaking drum.

RAYMOND J. KEPFER.